Aug. 26, 1941.   R. W. MUELLER   2,253,643
VALVE
Filed Nov. 9, 1940
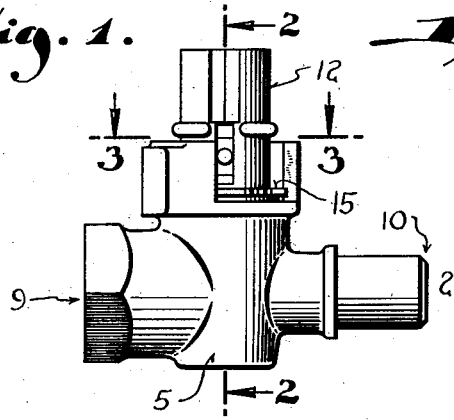
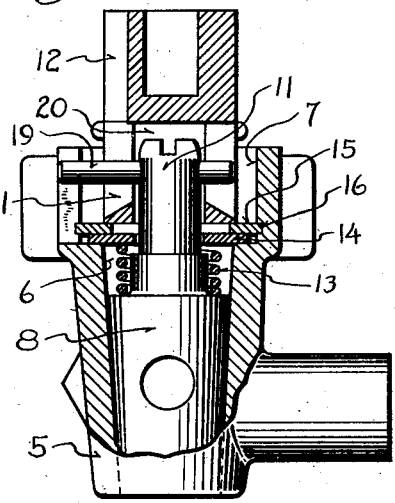
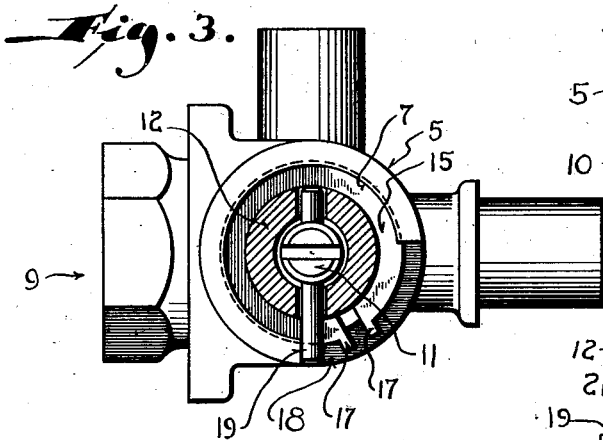
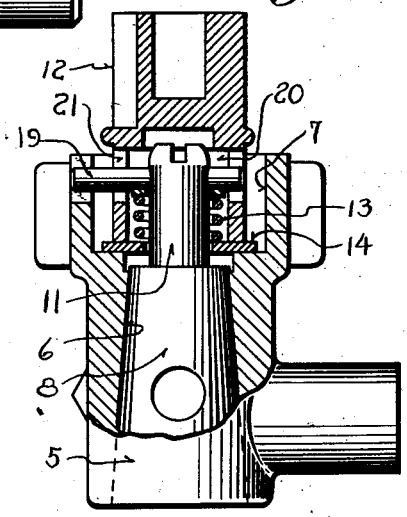
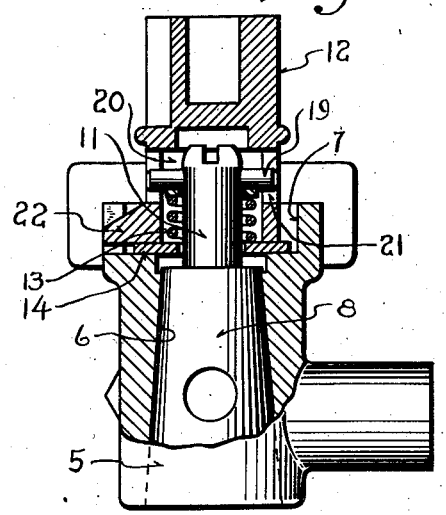
Inventor
Robert W. Mueller Patented Aug. 26, 1941

2,253,643

UNITED STATES PATENT OFFICE 2,253,643

VALVE

Robert W. Mueller, Milwaukee, Wis., assignor to Milwaukee Gas Specialty Company, Milwaukee, Wis., a corporation of Wisconsin Application November 9, 1940, Serial No. 365,046

11 Claims. (Cl. 251—112)

This invention relates to valves and refers particularly to valves of the type used as gas cocks for floor furnaces and the like.

In valves of this type one of the problems is to provide a practical nonrotatable driving connection between the actuator and the valve plug. Inasmuch as these valves are located at a substantial distance from the handle of the actuator, the connection between the actuator and the plug must be relatively loose to accommodate misalignment, and for obvious reasons it must also be so constructed that end thrust cannot be imparted to the valve plug from the actuator.

In addition there must be a practical manner of defining the limits of rotation of the plug and of holding the parts assembled.

With these objectives in mind, it is the purpose of this invention to provide a simple valve structure having a novel manner of connecting the coupling member of the actuator to the plug and at the same time providing rotation limiting means for defining the limits of rotation of the plug.

It is also an object or purpose of this invention to provide a valve wherein a single washer encircling the stem of the plug receives the thrust of the spring which holds the plug in place and also receives any down thrust imposed on the coupling to prevent the application of endwise force onto the stem of the plug.

Another object of this invention resides in the provision of novel means for securing this washer in place in a manner enabling quick assembly and disassembly of the parts.

Still another object of this invention is to provide a novel manner of constructing a valve for the purpose described, having an inverted plug or in other words, wherein the small diameter end of the plug carries the stem to which the driving force is applied.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates several complete examples of the physical embodiment of the invention constructed according to the best modes so far devised for the practical application of the principles thereof, and in which:

Figure 1 is a side view of a valve embodying one form of this invention;

Figure 2 is an enlarged view partially in cross section and partially in elevation taken on the plane of the line 2—2 in Figure 1;

Figure 3 is a cross sectional view taken through Figure 1 on the plane of the line 3—3.

Figure 4 is a view similar to Figure 2, but illustrating the application of this invention to a construction wherein the plug is inverted; and Figure 5 is a view also similar to Figure 2 and illustrating a slight modification of that type of valve shown in Figure 4.

Referring now particularly to the accompanying drawing in which like numerals indicate like parts, the numeral 5 designates the body or barrel of a valve designed for use with gas appliances and specifically for use in the manifold assembly of a floor furnace.

Disposed vertically in the main portion of the barrel or body 5 is a tapered bore 6. In that form of the invention illustrated in Figures 1, 2 and 3, the large diameter end of the bore is at the top and opens to a counterbore 7; whereas in that form of the invention shown in Figures 4 and 5, the bore 6 is inverted so that its small diameter end opens to the counterbore. In each instance a tapered plug 8 is rotatably mounted in the bore to control communication between an inlet designated generally by the numeral 9 and an outlet indicated by the numeral 10.

In all cases the plug 8 has a stem 11 projecting upwardly therefrom into the counterbore 7 for connection with a coupling member 12 by which turning force is transmitted to the plug from an actuator (not shown) which extends upwardly from the coupling member to have its handle at the floor level when the valve is used with a floor furnace.

In that form of the invention shown in Figures 1, 2 and 3, a coil spring 13 is coiled about the base of the stem 11 to be confined between the upper large diameter end of the plug proper and a washer 14 resting on the bottom of the counterbore 7 and thus hold the plug down in its bore.

The thrust of the spring 13, however, reacts upwardly against the washer. Hence, means must be provided for holding the washer in place. This is accomplished in a novel and exceedingly simple manner through the provision of a split spring snap ring 15. The outer periphery of this snap ring engages in an annular groove 16 in the side wall of the counterbore near its bottom wall, the location of the groove being such that the ring holds the washer in place substantially without play.

To provide for disassembly the split spring snap ring has an outward abutment or projection 17 on each of its ends. These projections are accessible through a segmental recess 18 in the side of the counterbore so that with an appropriate tool the snap ring can be compressed and disengaged from its groove.

The ends of the segmental recess serve as stationary stops with which one end of a cross pin 19 fixed in the stem collides to define the limits of rotation of the plug.

The cross pin 19 also provides the driving connection between the coupling member 12 and the stem 11. The connection between the coupling member and the stem is formed by having the stem enter a socket 20 in the lower end of the coupling which is received in the counterbore. The socket is of a size to loosely receive the upper end of the stem and is sufficiently deep to permit the coupling member to rest on the snap ring 15 without hindrance from the stem. Hence, all downward thrust on the actuator is carried by the valve body and not imposed on the plug.

A transverse slot 21 through the socketed lower end of the coupling member receives the cross pin 19 and cooperates therewith to complete the driving connection.

In that form of the invention shown in Figure 4, where the plug is inverted, the washer 14, which encircles the stem and rests on the bottom of the counterbore, also receives the thrust of the spring but in this instance the spring is located above the washer so that it presses the washer down against the bottom of the counterbore. The upward thrust of the spring is transmitted to the plug through the cross pin 19, as will be readily apparent.

In this embodiment of the invention, the lower socketed end of the coupling member not only loosely receives the stem, but also embraces the spring to thus provide a more compact construction.

In the modification shown in Figure 4 the limits of rotation of the plug are defined in the manner described, that is, by one end of the cross pin 19 colliding with the stationary stops, but in the embodiment of the invention shown in Figure 5, a separate movable stop 22 is provided. This stop consists of an outward radial projection cast on or formed as an integral part of the coupling, but as in the other embodiments, it still cooperates with the stationary stops in the manner aforesaid.

From the foregoing description, taken in connection with the accompanying drawing, it will be readily apparent that this invention provides a gas valve which is admirably suited for use with floor furnaces although it is not limited thereto, and that through the provision of the novel manner of assembling the various parts a substantial saving in cost of production is effected.

What I claim as my invention is:

1. In a valve: a barrel having a tapered bore and a counterbore at one end thereof; a tapered plug rotatable in the bore; a stem on the plug projecting into the counterbore; a coupling for drivingly connecting an actuator to the plug, said coupling being received in the counterbore and having a socket loosely receiving the stem; means for nonrotatably connecting the coupling with the stem so that rotation may be transmitted to the plug from the coupling; arcuately spaced stops on the side wall of the counterbore; and a radial extension rotatable with the coupling and stem and engageable with said stops to define the limits of rotation of the plug.

2. In a valve: a barrel having a tapered bore and a counterbore at one end thereof; a tapered plug rotatable in the bore; a stem on the plug projecting into the counterbore; a coupling projecting into the counterbore from its open end and having a socket loosely receiving said stem; means providing a rotation imparting driving connection between the coupling and stem; a washer encircling the stem and resting on the bottom of the counterbore, said washer receiving the inward thrust of the coupling member to preclude the application of end thrust onto the plug; and a coil spring encircling the stem for yieldingly urging the plug toward the small end of the bore, one end of said spring being supported by said washer.

3. In a valve: a barrel having a tapered bore and a counterbore at one end thereof; a tapered plug rotatable in the bore; a stem on the plug projecting into the counterbore; a coupling projecting into the counterbore from its open end and having a socket loosely receiving said stem; means providing a rotation imparting driving connection between the coupling and stem; a washer encircling the stem and resting on the bottom of the counterbore, said washer receiving the inward thrust of the coupling member to preclude the application of end thrust onto the plug; a coil spring encircling the stem for yieldingly urging the plug toward the small end of the bore, one end of said spring being supported by said washer; arcuately spaced stops on the side wall of the counterbore; and a radial projection rotatable with the coupling member and the stem and engageable with the stops to define the limits of rotation of the plug.

4. In a valve: a barrel having a tapered bore and a counterbore at one end thereof; a tapered plug rotatable in the bore; a stem on the plug projecting into the counterbore; a coupling member projecting into the counterbore through its open end and having a socket loosely receiving the stem, the socketed portion of the coupling member having a transverse slot communicating with the socket; arcuately spaced stops on the side wall of the counterbore; and a cross pin secured in the stem with its ends received in the opposite end portions of the transverse slot, one end of the pin projecting beyond the wall of the coupling member to collide with said spaced stops and define the limits of rotation of the plug.

5. In a valve: a barrel having a tapered bore and a counterbore at one end thereof; a tapered plug rotatable in the bore; a stem on the plug projecting into the counterbore; a coupling member projecting into the counterbore through its open end and having a socket loosely receiving the stem, the socketed portion of the coupling member having a transverse slot communicating with the socket; arcuately spaced stops on the side wall of the counterbore; a cross pin secured in the stem with its ends received in the opposite end portions of the transverse slot; and a radial projection on the socketed portion of the coupling member positioned to collide with said spaced stops to define the limits of rotation of the plug.

6. In a valve: a barrel having a tapered bore and a counterbore at one end thereof, said counterbore having an annular groove in its side wall;

a tapered plug rotatable in the bore; an extension on the plug projecting into the counterbore; a coupling member drivingly connected with the extension; a spring for yieldingly urging the plug toward the small end of the bore; and a spring ring engaging in said annular groove and forming a seat against which the spring bears so that the thrust of the spring is borne by the spring ring.

7. In a valve: a barrel having a tapered bore and a counterbore at one end thereof, said counterbore having an annular groove in its side wall; a tapered plug rotatable in the bore; an extension on the plug projecting into the counterbore; a coupling member drivingly connected with the extension; a spring for yieldingly urging the plug toward the small end of the bore; and a spring ring engaging in said annular groove and forming a seat against which the spring bears so that the thrust of the spring is borne by the spring ring, said spring ring also having a part positioned to receive inward thrust applied on the coupling member to preclude its application onto the plug.

8. In a valve: a barrel having a tapered bore and a counterbore at one end thereof, said counterbore having an annular groove in its side wall; a tapered plug rotatable in the bore; a stem on the plug extending into the counterbore; a washer encircling the stem and resting on the bottom of the counterbore; a coil spring encircling the stem and confined between said washer and a shoulder on the adjacent end of the plug for yieldingly urging the plug toward the small end of the bore; and a spring snap ring engaging in said annular groove and confining said washer between it and the bottom of the counterbore.

9. In a valve: a barrel having a tapered bore and a counterbore at one end thereof, said counterbore having an annular groove in its side wall near the bottom thereof and having a portion of its side wall cut away to provide a segmental recess, the ends of which form spaced stationary stops; a tapered plug rotatable in the bore; a stem on the plug projecting into the counterbore; a washer encircling the stem and resting on the bottom of the counterbore; a coil spring encircling the stem and confined between said washer and an adjacent part of the plug to yieldingly urge the plug toward the small end of the bore; a split spring snap ring having its outer periphery engaging in the annular groove and having its inner portion overlying the washer to hold it in place, said snap ring having abutments on its ends accessible through the segmental recess to provide means by which the ring may be compressed for disassembly; a coupling member having a socketed end portion received in the counterbore and resting on the spring snap ring with the stem of the plug loosely received in its socket; means for drivingly connecting the coupling member to the stem so as to enable the transmission of rotary force from the coupling member to the plug; and a radial projection extending from the side wall of the coupling member into the segmental recess for cooperation with the stationary stops.

10. In a valve: a barrel having a tapered bore provided with a counterbore at its large diameter end, the side wall of the counterbore having an annular groove in its inner surface adjacent to the bottom thereof, part of the side wall of the counterbore being cut away to form a segmental recess affording access to the counterbore from the side; a tapered plug rotatable in the bore; a spring seat resting on the bottom of the counterbore; a spring confined between said seat and an adjacent portion of the plug for yieldingly urging the plug inwardly toward the small end of the bore; a split spring snap ring having its outer periphery engaging in said annular groove and its inner portion overlying the spring seat to hold the same in place and support the same against the thrust of the spring; and abutments on the ends of the split spring snap ring accessible through the segmental recess so as to enable compression of the spring snap ring for disassembly of the valve.

11. In a valve: a barrel having a tapered bore and a counterbore at the small diameter end of the bore, the side wall of the counterbore having a portion cut away to provide a segmental recess, the ends of which form spaced stationary stops; a tapered plug rotatable in the core; an extension on the small diameter end of the plug projecting into the counterbore; a washer encircling the stem and resting on the bottom of the counterbore; a spring receiving support from said washer for yieldingly urging the plug toward the small diameter end of the bore; a coupling having a socketed end portion disposed in the counterbore with the stem of the plug loosely received in the socket; means for drivingly connecting the coupling to the stem, said means enabling a limited degree of relative nonrotary motion between the coupling member and the plug, and the coupling member being supported by said washer against inward thrust to preclude the application of such thrust onto the plug; and a radial projection extending from the side of the coupling member into the segmental recess for cooperation with the stationary stops.

ROBERT W. MUELLER.